United States Patent [19]

Onoda et al.

[11] Patent Number: 4,741,595
[45] Date of Patent: May 3, 1988

[54] OPTICAL TRANSMISSION DEVICE

[75] Inventors: Seiichi Onoda, Tokorozawa; Yasumasa Koakutsu, Fujisawa; Masaaki Kusano; Tamio Takeuchi, both of Yokohama; Syouji Yamada, Aichi; Masao Yano, Yokohama; Ichiro Ikushima, Yokohama; Kiyohide Miyake, Yokohama; Toshiki P. Tanaka, Oume, all of Japan

[73] Assignee: Hitachi, Ltd., Tokyo, Japan

[21] Appl. No.: 754,928

[22] Filed: Jul. 15, 1985

[30] Foreign Application Priority Data

Jul. 13, 1984 [JP] Japan .................. 59-144256
Jul. 18, 1984 [JP] Japan .................. 59-147512
Jul. 20, 1984 [JP] Japan .................. 59-149465

[51] Int. Cl.$^4$ .................................. G02B 6/08
[52] U.S. Cl. ....................... 350/96.27; 250/227; 350/96.20
[58] Field of Search ............ 350/96.10, 96.15, 96.17, 350/96.18, 96.20, 96.27; 250/227, 551; 357/19, 30, 74, 75, 17

[56] References Cited

U.S. PATENT DOCUMENTS 4,216,486  8/1980  Geddes ..................... 357/19
4,222,629  9/1980  Dassele et al. ............ 350/96.20
4,240,090  12/1980  Hughes et al. ........... 357/30

FOREIGN PATENT DOCUMENTS 2086073  5/1982  United Kingdom ........ 350/96.20

OTHER PUBLICATIONS

Dassele et al., "Packaging Hybrid Circuit Fiber Optic Transmitters and Receivers," *Electronic Packaging & Production*, Jan. 1980, pp. 135–141.

Primary Examiner—John Lee
Attorney, Agent, or Firm—Antonelli, Terry & Wands

[57] ABSTRACT

In a device for coupling optically a light source with an optical transmission path, the present invention interposes an optical transmission path structure at the center of the distance between them in order to improve the optical coupling efficiency. The optical transmission path structure consists of a plurality of light transmitting elements arranged so that the light from the light source is received by the structure as incident light and is sent out therefrom as outgoing light at an outgoing angle which is equal to the angle of incidence. The light transmitting elements are arranged in parallel with the optical path of the light emitted from the light source and according to this arrangement, the system of the present device becomes equivalent to a system in which the positions of the light source are located at points of $\pm l_1$ from the light outgoing surface of the optical transmission path structure. When used with an optical fiber, the optical transmission path structure is disposed such that the distance from the light source to one end face of the optical transmission path structure is the same as the distance from the end face of the means for transmitting to the other end face of the optical transmission path structure.

7 Claims, 6 Drawing Sheets

(a)

(b)

(a)

(b)

OPTICAL TRANSMISSION DEVICE

BACKGROUND OF THE INVENTION

This invention relates to an optical transmission device effective for improving the optical coupling efficiency between an optical element such as a light emitting element or a light receiving element (a photo detector) and an optical transmission path such as an optical fiber in optical devices requiring optical coupling between such an optical element and such an optical transmission path.

Demand has increased sharply in recent years for optical transmission circuits such as an optical transmission module (which will hereinafter be referred simply to as the "module"). The module consists of three fundamental constituents, i.e., an electric circuit, light emitting/receiving elements and an optical coupling system between the light emitting/receiving elements and an optical fiber. Among them, the electric circuit and the light emitting/receiving elements can be constituted either discretely or integrally by use of semiconductors, hence, the cost of production tends to decrease.

This is not the case with an optical coupling system. Aside from an optical fiber having a large diameter such as a plastic fiber, the optical coupling system becomes unavoidably complicated in construction if the optical fiber consist of ordinary quartz or multicomponent glass, and the module cost is greatly affected by said complicated comstruction.

The undesirable characteristics described above become more pronounced with high diffusiveness (incoherence) of a light emitting element such as a light emitting diode (hereinafter called an "LED"), with a smaller light receiving diameter of a light receiving element (a photo detector), with a smaller product of a numerical aperture (hereinafter called "NA") and an opening diameter (core diameter) of the optical fiber. However, if the construction of the optical coupling system is made simple at the sacrifice of the coupling efficiency, the loss margin between the transmission and reception sides decreases. To compensate for the loss, the light emission output or the reception sensitivity must be improved without decreasing the transmission loss of the optical fiber. However, this also involves predetermined limits from the aspects of practical application, performance and economy. Therefore, an optical coupling system having a simple construction and having high coupling efficiency between the optical element and the optical fiber, particularly between LED and the optical fiber, is earnestly required. Moreover, seal of the optical element and its easy detachability to and from the optical fiber are necessary.

The conventional methods of optical coupling can be broadly classified in principle into the following three methods.

The first method simply places the optical element and the optical fiber in such a manner as to oppose each other, and minimizes the distance between them. A so-called "Burrus" type lies at the extreme of this concept. More definitely, the chip surface of LED is etched near an active layer, and the end of an optical fiber is buried there into a resin.

In this case, the optical coupling efficiency can be improved close to the theoretical limit. However, this type is not at all practical because the take-out of the fiber is a so-called "pig tail" type which is difficult to handle as a module, and various difficulties occur in the production steps such as etching and hermetic sealing. Therefore, the most ordinary structure of the first method is such that an element is hermetically sealed in a package having a glass window, and a ferrule into which the optical fiber is packed is placed in such a fashion as to oppose the package outside from it. In this case, however, the distance between the optical element and the optical fiber is unavoidably more than the thickness of the glass window. In the case of a 0.2 mm$\phi$ LED and step index type optical fiber having an opening diameter of 0.2 mm$\phi$ and a numerical aperture of 0.5, for example, it is known experimentarily that the optical coupling efficiency falls off by about 1 dB when the distance between them increases by 0.1 mm within the range of distance of up to 1 mm. Since the glass window is generally at least 0.6 mm thick, the optical coupling efficiency drops by about 6 dB due to the thickness of the glass window. The drop of about t dB can be calculated to a fiber length of from 400 to 2,000 m in the case of a multi-component glass or quartz fiber, hence, this is indeed a great loss in terms of a transmission module. To sum up, this first method involves the problem of a low optical coupling efficiency, though it is easy to practice.

The second optical coupling method disposes a beam condensing means between the optical element and the optical fiber or at the end of the optical fiber in order to contract the output light from the optical element or the optical fiber to the other.

In order to condense the output light, lenses such as ordinary convex lenses, spherical lenses or rod lenses are used. Alternatively, the tip of the optical fiber is worked to a pointed ball. This method would be somewhat effective from the aspect of principle, but practical problems are yet left for a module to which the optical fiber is fitted and removed by use of a connector. Since the optical beam is contracted by a lens system, the accuracy of positioning between the optical element and the optical fiber drops as much in the perpendicular plane. On the other hand, the accuracy of positioning of the optical element to a stem or the like in a practical package is in the order of from dozens to 100 $\mu$m. Accordingly, it is practically necessary to bring the fiber end surface out of focus of the beam condensing system spaced apart from a beam waist. Thus, this method can provide the improvement of the coupling efficiency of only at most about 1 dB, and this method uses an increased number of optical components and makes the construction more complicated. In other words, the cost becomes too high in comparison with the effect obtained by the method. As described above, practical methods of improving optical coupling efficiency have not yet been established.

The practical package structure of the conventional light transmission/reception module is fundamentally based upon such a structure in which LED, an LED driving integrated circuit chip, a photo diode (PD) and a reception integrated circuit chip are sealed in separate containers, and for this reason, it is not easy to miniaturize the module. Moreover, since the number of the necessary components is great, the cost of production of the module can not easily be reduced. To satisfy these requirements, a structure such as shown in FIG. 1, for example, has been proposed. In accordance with this structure, a light receiving element (a photo detector) 2 is connected to a transparent substrate 1 via a wiring layer 3, and is placed in such a manner as to directly face an optical fiber 4. Another conventional structure disposes a shading region 5 between the transparent substrates 1' in order to prevent the escaping light as shown in FIG. 2. Though this structure can improve considerably the optical coupling efficiency, the size can not be reduced sufficiently because there is an inherent limit to the reduction of distance between the end of the optical fiber and the surface of the light receiving element. When an optical fiber having a large numerical aperture and a large core diameter is used, the optical coupling efficiency can not be improved sufficiently. When an LED is used as the light emitting element, it is difficult to take sufficient quantity of light into the optical fiber because the light emission by the LED has high diffusibility.

As the third method, the article "Packaging hybrid circuit fiber optic transmitters and receivers" in Electronic Packaging and Production, Jan., 1980, pp. 135–141, discloses a method of improving the optical coupling efficiency between an active area and an optical fiber by interposing an optical, mosaic-like face plate (FP) consisting of a fiber aggregate between the active area consisting of LEDs or the like and the optical fiber. However, since this method merely interposes the FP, the improvement of the optical coupling efficiency is not yet sufficiently high.

SUMMARY OF THE INVENTION

The present invention is directed to provide an optical transmission device which, though relatively simple in construction, can improve the optical coupling efficiency between a light emitting source such as an LED and an optical path such as an optical fiber.

To accomplish the object described above, the present invention disposes a plurality of those optical transmission elements which are arranged in parallel with the optical axis between the light emitting source and the optical path and are made in such a form that the angle of incidence of incident light thereto is equal to the angle of reflection of outgoing light therefrom.

The optical transmission elements are disposed such that the distance from the light source to one end face of the optical transmission path structure is the same as the distance from the end face of the means for transmitting to the other end face of the optical transmission path structure.

DESCRIPTION OF THE PREFERRED EMBODIMENTS

Hereinafter, the principle of the present invention, the substantiation of the principle and a preferred embodiment of the present invention will be described.

[Principle of the Invention]

Figure 1:
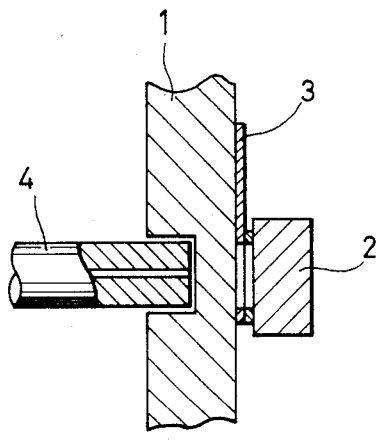
FIGS. 1 and 2 are sectional views, each showing a coupling portion between heretofore known optical element and optical fiber.
Figure 2:
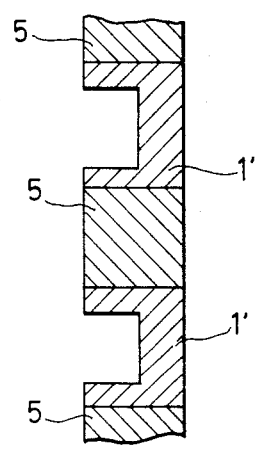
Figure 3:
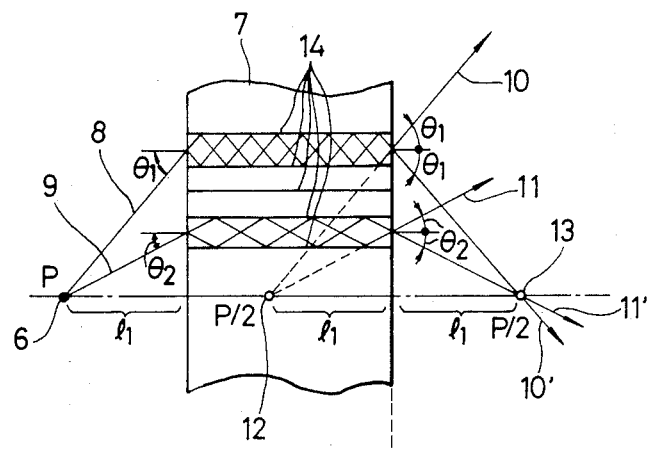
FIGS. 3(a), 3(b) and 4(a), 4(b) are schematic views, each useful for explaining the principle of the present invention.
Figure 3:
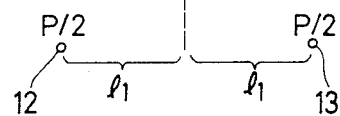

It will be assumed that in FIG. 3(a), a point source 6 having an optical power level P is spaced apart by a distance $l_1$ from an optical transmission path structure 7 and faces the same, and that the resolution of the optical transmission path is infinitely small, a numerical aperture (NA) is [1] and transmission loss is [0]. Rays of light 8, 9 leaving the point source 6 and incident to the optical transmission path structure 7 at angles $\theta_1$, $\theta_2$ are totally reflected by a reflecting plate 14 in the optical transmission path structure 7, and propagate in the direction of thickness. The outgoing rays of light from the optical transmission path structure 7 are divided into two groups of rays 10, 10' and 11, 11' having angles of reflection of $\pm\theta_1$ and $\pm\theta_2$, respectively. The pair of rays share the same optical power level.

It is obvious hereby that the outgoing rays 10 and 11 start from a point 12 spaced apart by a distance $l_1$ from the outgoing surface on the optical axis and that the outgoing rays 10' and 11' pass through a point 13 spaced apart by a distance $l_1$ from the outgoing surface on the optical axis. Therefore, the optical system shown in FIG. 3(a) can be regarded as equivalent to an optical system in which two point sources 12 and 13 having an optical power level P/2 are located at positions $\pm l_1$ from the outgoing surface of the optical transmission path structure in a free space, as shown in FIG. 3(b).

Figure 4:
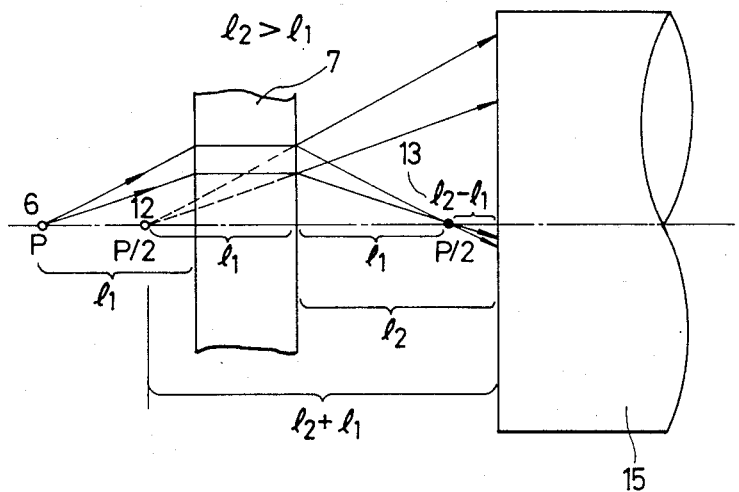
Figure 4:
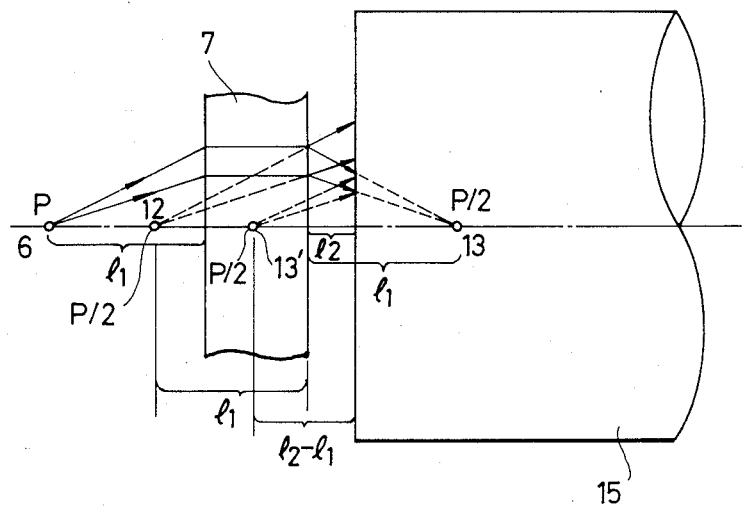

These points 12 and 13 will be hereinafter called "first and second light sources 12 and 13", respectively. Next, an example will be considered in which an optical fiber 15 is disposed in such a manner as to face the outgoing side of the optical transmission path structure 7 to couple the light source outputs as shown in FIG. 4.

First of all, when the distance $l_2$ between the optical transmission path structure 7 and the optical fiber 15 is $l_2 > l_1$, it can be understood easily that this system is equivalent to a system in which two point sources having an optical power level P/2 exist at positions $l_1 \pm l_2$ from the end surface of the optical fiber, respectively.

Next, if $l_2 < l_1$ as shown in FIG. 4(b), it is possible to consider that a third light source which serves as a mirror image with respect to the end surface of the optical fiber exists in place of the second light source. For, the optical coupling efficiency does not change even when the code of the angle of incidence to the optical fiber 15 inverts. Therefore, the optical system in this case can be regarded, as equivalent to a system in which two light sources are located at positions of $l_1 \pm l_2$ from the end surface of the optical fiber 15. In the ordinary case in which FIGS. 4(a) and 4(b) are put together, it can be understood that the positions of the two light sources from the end surface of the optical fiber 15 is given by $$|l_1 \pm l_2|$$

The equivalent relation described above is irrelevant to the thickness t of the optical transmission path structure.

As described above, when the output of the light source is coupled to the optical fiber 15 through the light transmission path structure 7, there can be obtained the effect that the distance between the light source and the optical fiber can be reduced equivalently.

If $l_1=l_2$, for example, the system can be regarded equivalently as one in which a point having an optical power level of ½ of that of the light source is in close contact with the end surface of the fiber 15, while the other point having the optical power level of ½ is located at a position spaced apart by $l_1$ from the end surface of the fiber 15. Therefore, the effect of improving the optical coupling efficiency is theoretically obvious. On the other hand, the optical system is extremely simple in construction, and the position of the optical transmission path structure 7 inside the vertical plane is entirely free. Therefore, unlike a lens system, the limitation to the accuracy of positioning can be reduced.

[Experimental substantiation of the principle of the present invention]

Figure 5:
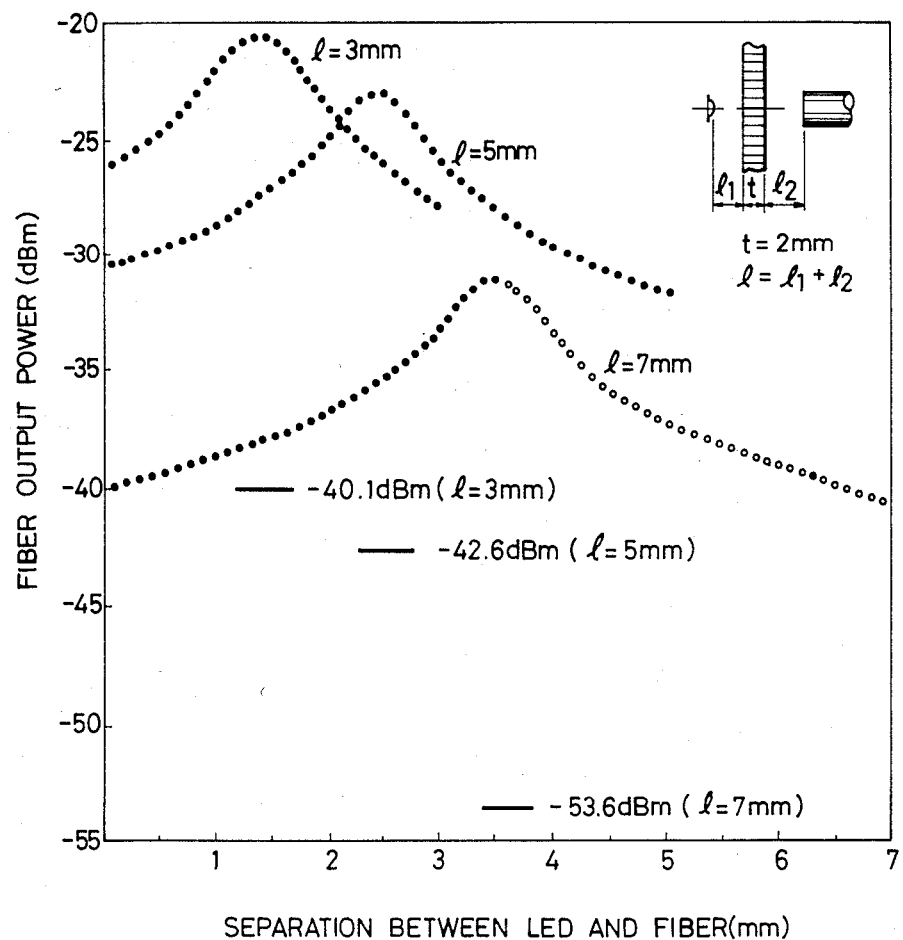
FIG. 5 is a diagram showing the experimental result of the present invention.

FIG. 5 is a diagram showing the actually measured values of the fiber output power (mean levels) when a dome-like LED (a light wavelength 0.88 μm, a driving peak current 30 mA, duty 50%) having a light emitting diameter of 600 μmφ is used as the light source, the optical fiber is of a step index type having a core diameter of 200 μmφ and a numerical aperture of 0.5, the optical transmission path structure has resolution of 25 μmφ, a numerical aperture of 0.55, a thickness of 2 mm and transmission loss of 1.3 dB and $l_1$ is changed variously with $l=l_1+l_2$ being kept constant.

It can be understood from the diagram that the fiber output reaches the maximum particularly when $l_1=l_2=l/2$, and has the values of $-20.7$ dB, $-23$ dB and $-32$ dB when $l=3$ mm, 5 mm and 7 mm, respectively.

On the other hand, before the optical transmission path structure is interposed, the output levels are $-40.1$ dB, $-42.6$ dB and $-53.6$ dB, respectively, as shown in the diagram. Therefore, the optical coupling efficiency can be improved by 19.4 dB, 19.6 dB and 21.6 dB, respectively, by interposing the optical transmission path structure 7. Thus, the effect of improving the fiber coupling efficiency by interposing the optical transmission path structure is experimentally demonstrated.

The effect of improving the coupling efficiency can naturally be obtained in exactly the same way when the output light from the optical fiber is introduced into the light receiving element. In this case, the light source described above corresponds to the output light from the optical fiber, and the fiber described above which is the means for receiving the light through the optical transmission path structure and transmitting the light corresponds to the light receiving element.

For ease of description, the following description will use an LED as the light source and an optical fiber as means for transmitting the light, but the present invention is not particularly limited to that configuration.

As described above, since the optical transmission path structure 7 is disposed in parallel with the optical axis, the effect obtained thereby is great and reaches the maximum particularly when the structure 7 is positioned at the center between the LED and the optical fiber such that $l_1=l_2$ as shown in FIG. 5. Needless to say, various transmission path structures can be selected. For example, if the structure is arranged in a radial concentric circle as shown in FIG. 6 or 7, a packing density can be improved and the condensing accuracy (the variance of position of the second light source) can also be improved.

Figure 6:
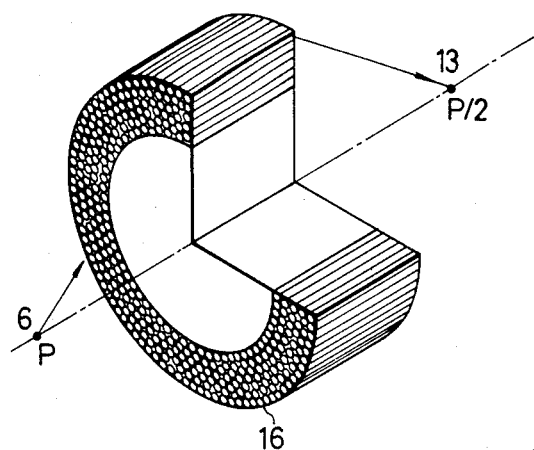
FIGS. 6 and 7 are perspective views, each showing a different optical transmission path structure of the present invention.
Figure 7:
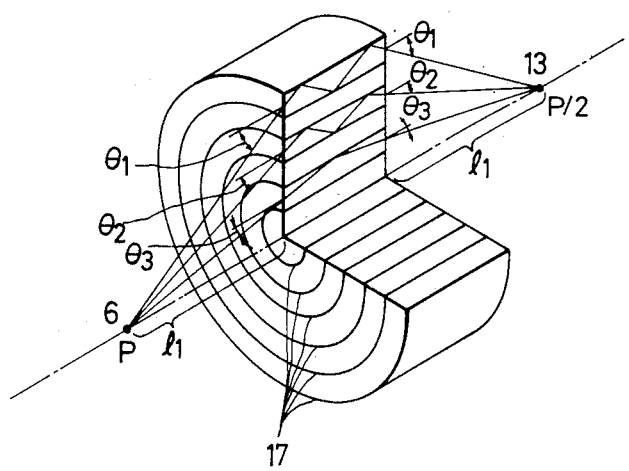

Reference numeral 16 in FIG. 6 represents the optical fiber, and reference numeral 17 in FIG. 7 represents a reflecting plate. In either case, a point source 13 having an optical power level ½ with respect to the point source 6 having the optical power level P occurs in the same way as in the foregoing description. The center of the optical transmission path structure may be made hollow, whenever necessary, as shown in FIG. 6.

Figure 8:
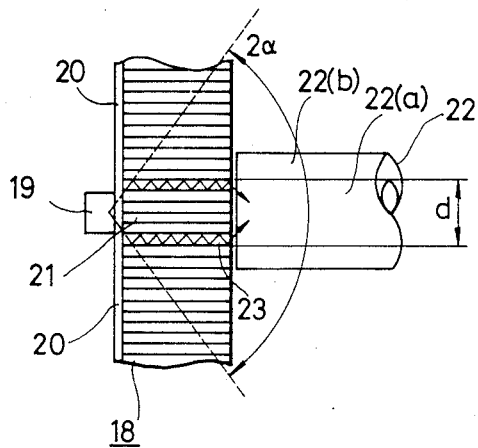
FIG. 8 is a sectional view showing one embodiment of the present invention.

As can be understood from the description given above, in a structure in which the LED 19 is directly connected to one surface of a face plate 18 as shown in FIG. 8, the structure is substantially equivalent to a structure in which the LED is positioned on the opposite surface of the face plate 18 as the light outgoing surface. In FIG. 8, reference numeral 20 represents a wiring conductor formed on the face plate 18. The light outgoing from the LED has a high degree of diffusibility represented by 2α in FIG. 8, and is taken into the core 22(a) of the optical fiber 22 through the core 21 of the face plate 18. Reference numeral 22 (b) represents the cladding of the optical fiber.

The refractive index of the fiber 23 is somewhat greater than that of the cladding, and the diameter of the fiber 23 is sufficiently smaller than the core diameter d of the transmission path fiber and the light emitting-/receiving surface of the optical element. The numerical aperture of the fiber 23 is equal to, or greater than, that of the transmission path fiber.

When the face plate is used, the position of the light surface as viewed from the end surface of the fiber serves as if it were closer by the thickness of the face plate.

Figure 9:
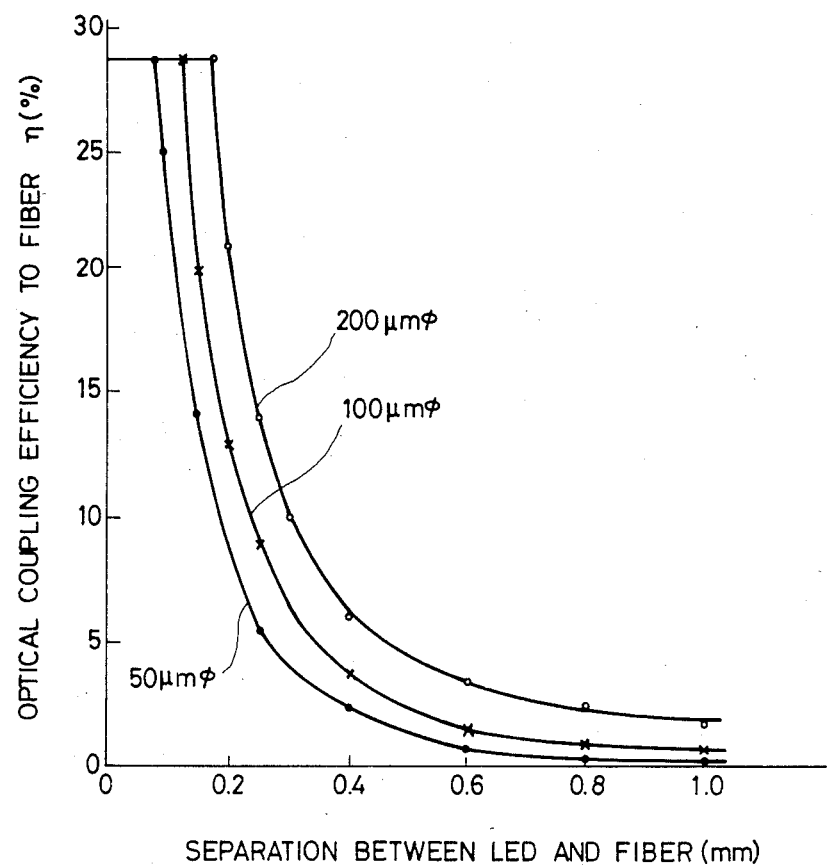
FIG. 9 is a diagram graphically representing the effect of the present invention.

FIG. 9 shows an example of the calculated numeric values representing the effect of the present invention. The diagram shows the optical coupling efficiency with respect to the separation or distance between the LED and the end surface of the fiber when the light emitting diameter of the LED is 50, 100 and 200 μmφ, respectively, and the fiber has a core diameter of 200 μmφ and a numerical aperture of 0.5. The light emitting pattern of the LED exhibits a Lambertion distribution. When the light emitting diameter of the LED is 50 μmφ, the light emitting efficiency at $l=1$ mm is about 0.5%, and this can be improved by about 27% when $l=0$. This corresponds to the improvement of about 17 dB in terms of the optical power level, and it can be understood that improvement of about 15 dB can be obtained even when the transmission loss of the face plate is taken into account.

A structure having a core and a cladding layer can also be used as the optical transmission path structure, and the lens effect can be further improved by applying thereto a spherical work. The transmission path structure can be used also as the window of the optical element.

[Embodiment of the Invention]

Figure 10:
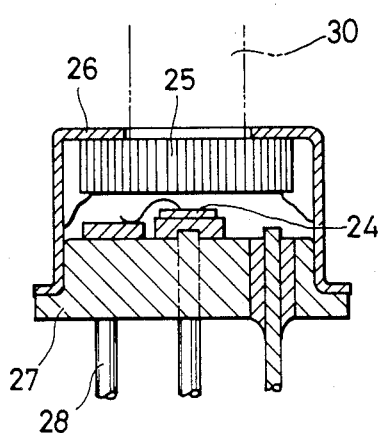
FIGS. 10, 11 and 12 are sectional views, each showing an example when the present invention is applied to an optical transmission module.
Figure 11:
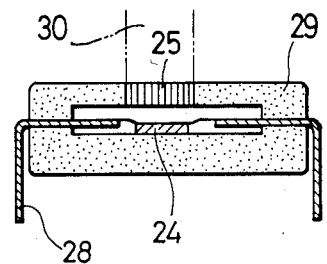

FIGS. 10 and 11 show an embodiment which uses a face plate (FP) as the optical transmission path structure. This FP is produced by putting together fiber bundles having an extremely small diameter, slicing the bundles and polishing both end surfaces. The numerical aperture and resolution of FP are determined by those of the reduced diameter fibers that constitute the FP, and the numerical aperture is generally from 0.2 to 1 and the core diameter generally ranges from several to dozens of microns (μmφ). The FP is interposed between the optical element and the light transmitting optical fiber.

In order to improve the optical coupling efficiency to the fiber, an extremely advantageous arrangement is that the distance $l_1$ between the optical element and the end surface of the FP on the side of the optical element and the distance $l_2$ between the end surface of the fiber and the end surface of the FP on the side of the fiber are made equal to each other, and both of these distances are reduced, as described already. In this embodiment, the FP 25 is used as the window of the cap 26 of the optical element 24. To insure sufficient reliability, the optical element 24 must generally be sealed hermetically, but an air-tight transparent window must be disposed for the input and output of the light. Through glass or sapphire is mostly used as the window material, the distance between the optical element 24 and the fiber 30 is elongated by at least the thickness of the material, and this is disadvantageous from the aspect of the optical coupling efficiency, as described already. Therefore, the fundamental embodiment of the present invention has a structure such as shown in FIGS. 10 and 11. In the drawings, reference numerals 27, 28 and 29 represent a stem, a pin and a package housing, respectively. As an advanced form of this embodiment, it is preferred that not only the optical element but also an electronic IC having other circuit functions be package-mounted.

Figure 12:
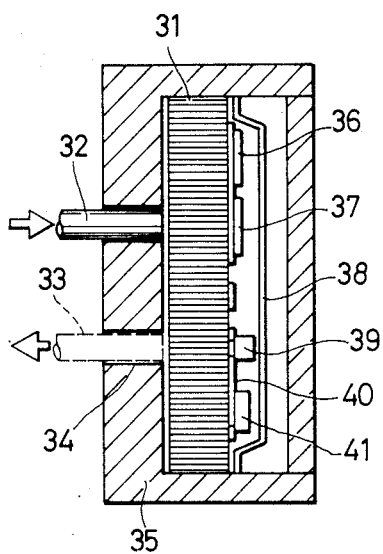
Figure 13:
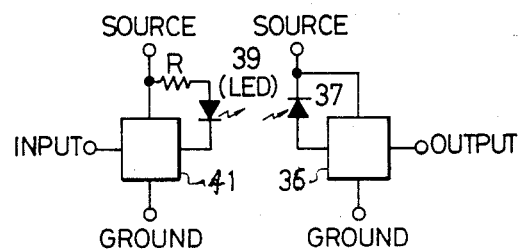
FIG. 13 is a block circuit diagram of the embodiment shown in FIG. 12.

FIG. 12 shows an embodiment in which the light transmitting portion and the light receiving portion are integrated, and FIG. 13 is its block circuit diagram.

In FIGS. 12 and 13, an optical signal produced by an LED chip 39 and an LED driving chip 41 is sent to a transmitting fiber 33 through an optical transmission path structure consisting of a face plate 31. An optical signal from outside passes through the transmitting fiber 32 and reaches a light receiving element or photo detector through the optical transmission path structure consisting of the face plate 31 described above. Reference numeral 36 represents a reception IC chip, 40 is a wiring conductor, 35 is a container (made of a resin, for example), and 34 is the fitting portion with the transmitting fiber which is disposed on the container. Symbol R represents a current limiting resistor for the LED.

As described above, in accordance with the present invention, the position of the condensing point changes with the distance from the light emitting point, and the optical system has performance which is equivalent to a so-called "varifocal lens", and can be applied to various applications.

Particularly because the two light emitting points occur apparently as described already, the light source itself can efficiently transmit the light by the disposition of the light transmission path structure. In other words, when the present invention is applied to optical signal transmission (including both transmission and reception), the distance between the optical element and the end surface of the fiber can be remarkably reduced, or the surface of the optical element and the end surface of the fiber can be equivalently brought into substantial contact with each other. Therefore, the coupling efficiency between the optical element and the fiber can be improved to the highest possible level. If an optical transmission path structure having an improved resolution is used, the rays of outgoing light can be made symmetrical with respect to the optical axis even when the incident light to the optical transmission path structure is an asymmetric beam with respect to the optical axis having a wide expanding angle such as a semiconductor laser. This is fundamentally because the rays of light incident to the individual optical transmission path structure become axially symmetric beams.

Next, the optical transmission path structure can be used as an NA filter. It is easy to provide the optical transmission path structure with a peculiar NA and with a function of preventing the straying light. Therefore, the output of the optical transmission path structure is limited within a range of predetermined angle. If the NA of the optical transmission path structure is selected to be not greater than that of the fiber, the mode excited in the fiber is only a propagating mode, and a cladding mode is not excited. When the diffused light such as from the LED is incident to the fiber, a large number of cladding modes are excited so that the fiber application power is apparently evaluated at a higher level. This must be compensated for as the addition-loss of the fiber, but the evaluation of the addition-loss is generally not so easy. Therefore, if the excitation of the cladding modes is prevented by inserting the FP, the input power to the fiber can be evaluated correctly.

Since the mutual interferrence between the adjacent devices due to the leaking light or the straying light can be prevented, it is easy to constitute an optical transmission module of an integral transmission-reception type by mounting the light emitting and receiving elements together with a peripheral IC element onto the same substrate, and the module can also be miniaturized. The present invention is extremely effective also for a multi-channel optical module structure in which a large number of optical elements are disposed in such a manner as to face a so-called "sheet fiber" formed by aligning a plurality of optical fibers, and can cope with the requirement for multiple functions. Furthermore, since each element need not be sealed individually and since the number of necessary components can be reduced, the present invention is economical and is advantageous from the aspect of reliability, also.

What is claimed is:

1. An optical transmission device comprising:
    a light source;
    an optical transmission path structure comprising a plurality of light transmitting elements disposed in an optical path of transmission light emitted from said light source for receiving the transmission light as incident light having an angle of incidence and for outputting the incident light at an outgoing angle equal to the angle of incidence; and
    means for transmitting the light output by said optical transmission path structure;
    each of said light transmitting elements of said optical transmission path structure being arranged in parallel with the optical path of the transmission light being disposed such that the distance from the light source to one end face of the optical transmission path structure is the same as the distance from the end face of the means for transmitting to the other end face of the optical transmission path structure.

2. The optical transmission device as defined in claim 1 wherein said optical transmission path structure consists of an aggregate of optical fiber.

3. The optical transmission device as defined in claim 1 wherein said optical transmission path structure is formed in a radial concentric circle.

4. An optical transmission device comprising:
    an optical element;
    an optical fiber; and
    an optical transmission path structure comprising a plurality of light transmitting elements disposed in an optical path between said optical element and said optical fiber for outputting transmission light at an outgoing angle equal to an angle of incidence of the transmission light incident thereto;

each of said light transmitting elements of said optical transmission path structure being arranged in parallel with the optical axis of the transmission light and being disposed such that the distance from the optical element to one end face of the optical transmission path structure is the same as the distance from the end face of the optical fibe to the other end face of the optical transmission path structure.

5. The optical transmission device as defined in claim 4 wherein said optical transmission path structure consists of an aggregate of optical fiber.

6. The optical transmission device as defined in claim 4 wherein said optical transmission path structure is formed in a radial concentric circle.

7. The optical transmission device as defined in claim 4 wherein a light emitting element, a driving circuit of said light emitting element, a light receiving element and a reception circuit for said light receiving element are disposed on said optical transmission path structure, said optical transmission path structure comprising a substrate consisting of an aggregate of optical fiber.

* * * * *